Dec. 30, 1930.  A. WILLIAMSON  1,786,589
TILTING DEVICE FOR VEHICLES
Filed Nov. 2, 1929  3 Sheets-Sheet 1

INVENTOR.
Alva Williamson
BY
ATTORNEYS.

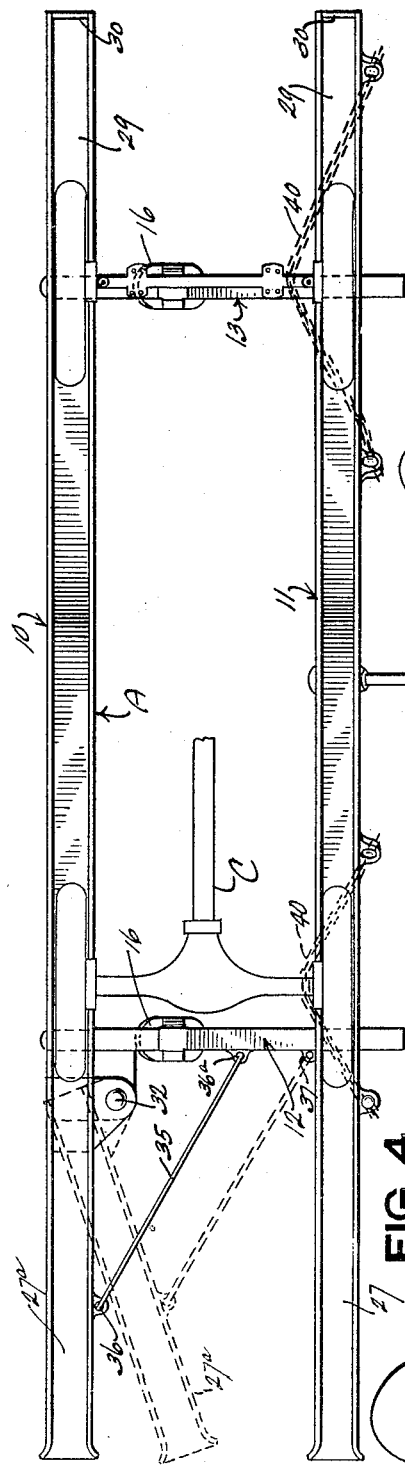
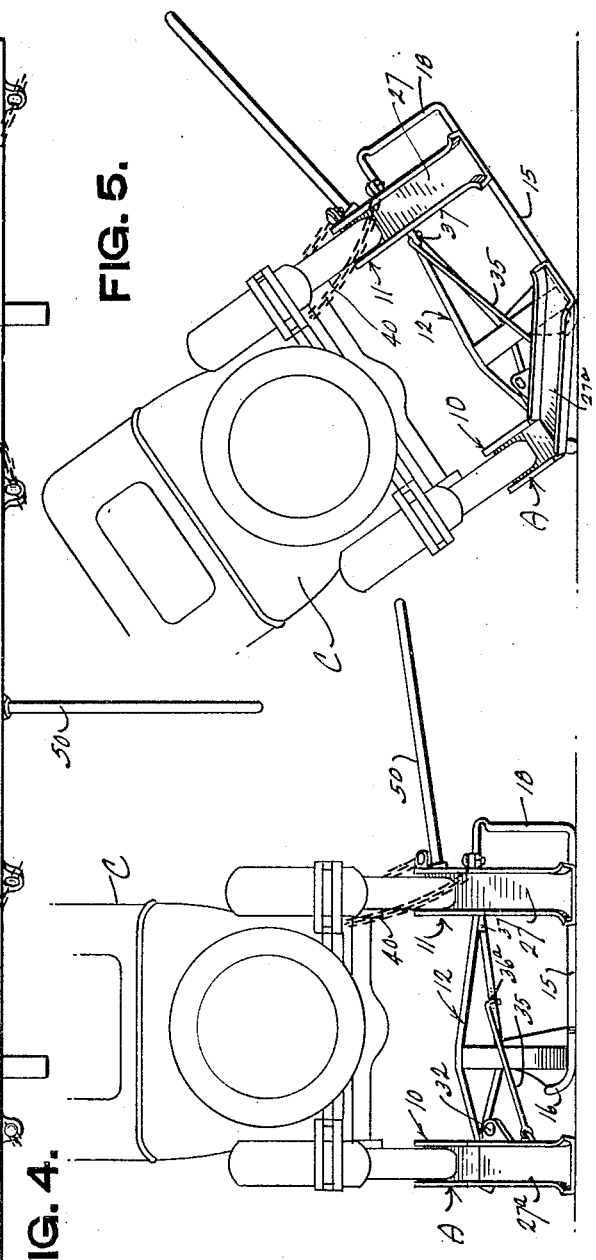

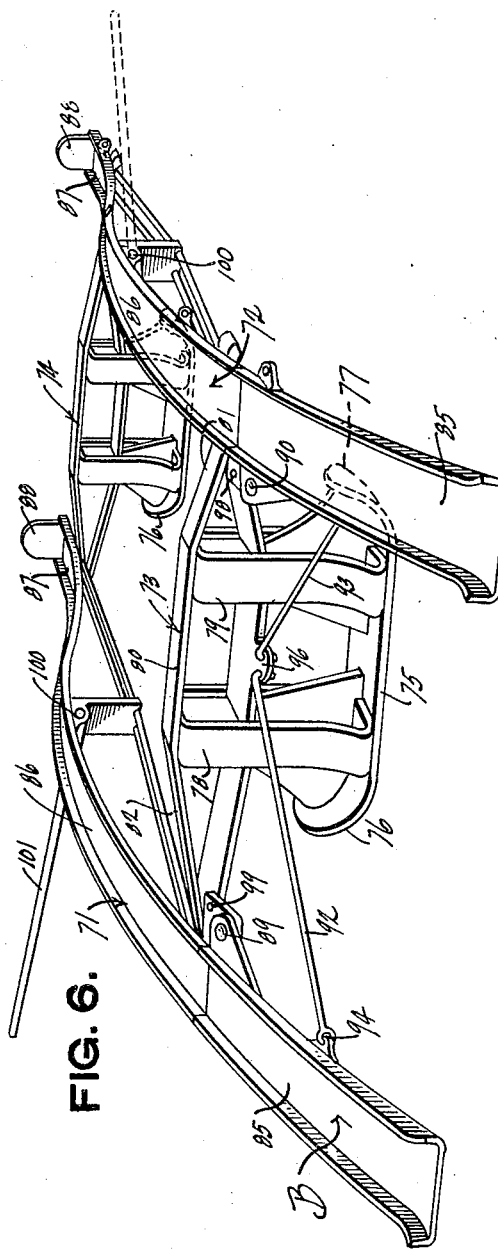

Patented Dec. 30, 1930

1,786,589

UNITED STATES PATENT OFFICE

ALVA WILLIAMSON, OF SAN BERNARDINO, CALIFORNIA

TILTING DEVICE FOR VEHICLES

Application filed November 2, 1929. Serial No. 404,312.

This invention relates to an improved device for tipping of vehicles so that access may be readily had to the under part of the chassis, and the like.

The primary object of this invention is the provision of an improved vehicle tilting device, in some respects similar to the device of my U. S. Patent #1,692,715, patented November 20, 1928, but differing thereover in the provision of a practical and efficient frame structure in which the base is rigidly connected to the trackway for the wheels of the vehicle, with an improved fulcrum upon the base which will permit the facile tilting of the frame structure to a rest position for inclining the vehicle at an angle of 45°.

A further object of this invention is the provision of an improved vehicle tilting device which will permit of tilting of a vehicle without any considerable exertion of manual effort, to an inclined position where the same may come to rest in a position which will be maintained by reason of the eccentric weight of the vehicle; the frame being free of pivot parts which are relatively movable to enable the tipping action, such as shown in my patent above referred to.

Other objects and advantages of this invention will be apparent during the course of the following detailed description.

In the accompanying drawings, forming a part of this specification, and wherein similar reference characters designate corresponding parts throughout the several views;

Figure 3 is a plan view of my improved tilting device, showing the relation in which the wheels of the vehicle rest thereon just prior to tilting, and in dotted lines showing the relation in which one of the runway sections of the trackway arrangement is swung just prior to the tilting action.

Figure 4 is an end view of the improved frame, showing a vehicle thereon, the view being taken from the runway end of the device, with the vehicle in upright position.

Figure 5 is a view similar to Figure 4, with one of the runway sections of the trackway swung to a position which will enable the frame to be tilted for throwing the vehicle to an inclined position.

Figure 6 is a perspective view of a modified form of tilting frame, by means of which the vehicle may be tilted to either side of the longitudinal axis or center line of the frame.

Figure 7 is a plan view of the tilting frame of Figure 6, showing in dotted lines the relation in which one or the other or both of the runway sections of the trackway system of the tilting device may be swung from their full line position shown in Figure 6, to facilitate tipping action at the side desired.

Figure 1:
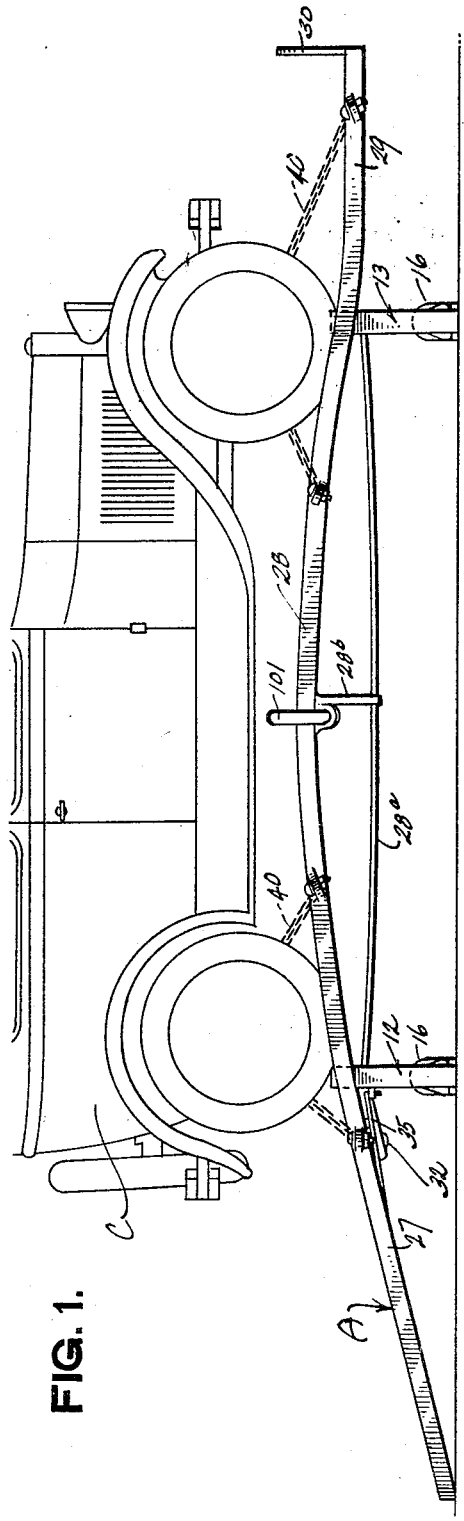
Figure 1 is a side elevation of my improved tilting device, showing the vehicle mounted thereon in an upright position.

In the drawings, wherein for the purpose of illustration are shown preferred and modified forms of the invention, the letter A may generally designate a preferred form of tilting device and B a modified form. In many respects both forms of the invention are similar, and insofar as applicable to both forms of the invention, similar reference characters are intended to apply to corresponding parts.

Referring to the invention A, the same comprises trackways 10 and 11 disposed in substantial parallelism and supported by improved fulcruming standards 12 and 13 of similar construction.

Figure 2:
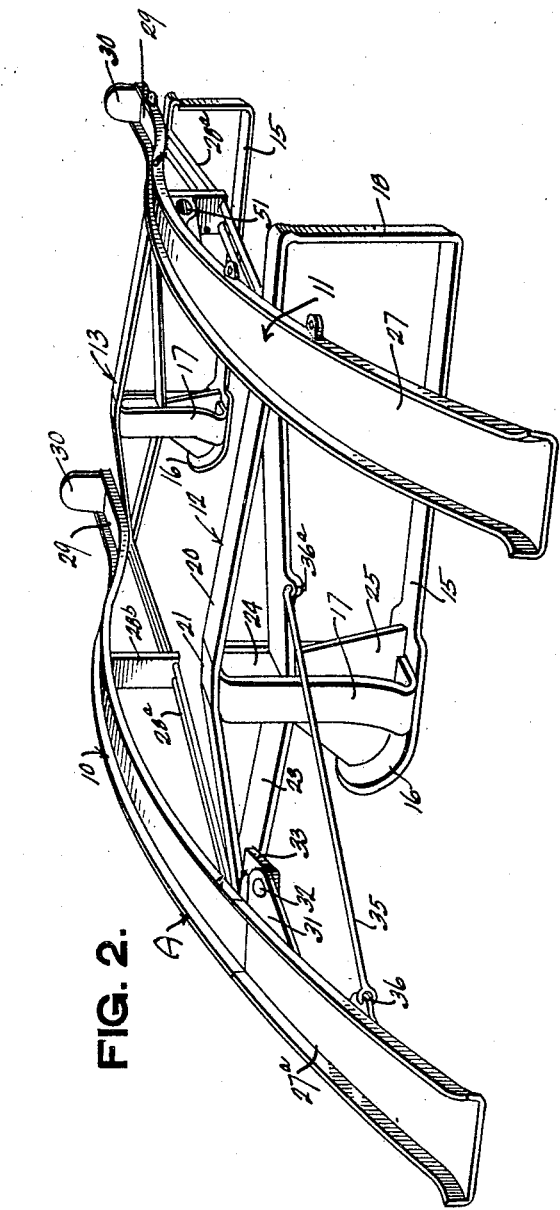
Figure 2 is a perspective view of my improved tilting device.

Each of the standards 12 and 13 includes a straight line foot piece or bottom portion 15, one end 16 of which is arcuated upwardly, defining a downwardly facing convex fulcrum on which the frame A is intended to pivot as an axis; the curved end 16 being relatively short and disposed, as will be subsequently mentioned, at a location preferably between the lines of the trackways 10 and 11. Uprights 17 and 18 are provided at the ends of the straight portion 15 of the standards 12 and 13; the uprights 17 and 18 being respectively adjacent and remote with respect to the fulcrumed end 16. At the upper ends the uprights 17 and 18 support a cross beam structure upon which the trackways 10 and 11 are respectively mounted. Such cross beam structure includes an upper member 20, connected at 21 on top of the upright 17 and therefrom extending at opposite sides downward and convergently, one end being extended beneath and connected rigidly to the trackway 11 and extending outwardly therebeyond and connected, of course, to the upper end of the upright 18. The opposite end portion of the beam 20 extends beneath the trackway 10 and is rigidly secured thereto. A suitable lower brace beam 23 is secured at 24 to the upper end of the upright 17, spaced beneath the attaching location 21, and at opposite sides of the uprights 17 extending upwardly in a divergent relation, one end being secured to the portion 20 beneath the track 11, and at the opposite end of the beam 23 being secured to the beam 20 beneath the track 10, as clearly shown in Figure 2 of the drawings. The top cross beam on which the trackways 10 and 11 are mounted may be bolted, riveted, welded, or otherwise secured at the top of the upright 17, and may be stabilized by downwardly extending braces 25 secured to the foot piece 15 beneath the cross beam portion 23, as shown in the drawings.

The trackway 11 includes an entrance or runway portion 27, the lower end of which is adapted to contact on the floor or ground surface and hence lies in the same plane as the foot portions 15 of the standards 12 and 13. The runway 27 slopes upwardly, crossing and being secured to the cross beam of the standard 12, and between the standards 12 and 13 being upwardly convexed at 28. Beyond the standard 13 it extends horizontal as shown at 29, being provided with a stop 30 at the end thereof. Of course, the trackways 10 and 11 are of channel-shaped construction, being provided with opposite side guard flanges, as is usual, to prevent lateral displacement of the vehicle wheels. If desired, the guard flanges may be flared outwardly at the entrance end of the runway portions of the trackways.

The trackway 10 is constructed identically as to the trackway 11, except that the runway portion 27ª thereof is provided with a lateral offset 31 near the standard 12, which is detachably pivoted at 32 to a lateral extension 33 rigid with the other portion of the trackway 10, as shown in the drawings. This pivot axis 32 lies between the trackways 10 and 11, and permits the runway portion 27ª of the trackway 10 to be swung inwardly, as shown by the dotted lines in Figure 3 of the drawings, when it is desired to tip the frame A on the fulcrum portions 16 of the standards 12 and 13. The runway portion 27ª, of course, normally aligns with the outer portions of the trackway 10, as shown in Figure 3, and in such position it may be braced by a diagonal brace rod 35, which is pivoted at 36 intermediate the ends of the runway portion 27ª, which has a releasable connection at 36ª on the top cross beam of the standard 12, as shown in Figure 3. This connection 36ª is such as to permit detachment of the cross beam 35, which may then connect in an eye or connection 37 on the cross beam 12, closer to the runway 11, to permit the runway section 27ª to be inclined and held as shown in the dotted position in Figure 3, in an acute angular relation with respect to the line of the remaining portion of the trackway 10.

As shown in the drawings, in the form of invention A, the short fulcrum ends 16 of the standards 12 and 13 are so disposed as to place the fulcrum or pivot axis of the frame closer to the trackway 10 than the trackway 11. This prevents any lateral overbalance of the frame when the vehicle C, as shown in Figure 1, is being driven onto the device. However, it is to be distinctly understood that the fulcrum ends 16 may be located along the central line of the improved frame A, if found desirable and expedient. Of course, under such circumstances the side of the frame toward which the vehicle tips must be propped or otherwise braced.

As is also a feature of the invention set forth in my patent above mentioned, I prefer to provide flexible clamping members, such as chains or cables 40 secured at their ends upon the outside portion of the trackway 11, adapted to clamp over the wheels against the axles of the vehicle to permit the vehicle to tip with the frame A against liability of falling off the frame during the tipping action.

From the foregoing description it is quite apparent that in order to tip the vehicle it is merely necessary to swing the runway section 27ª to the position shown in Figure 3. Thereafter an operating handle or lever 50 may be inserted in a suitable socket 51 provided in the trackway 11, beneath the same, and between the standards 12 and 13, and upon pulling upward the frame A it may be tipped upon the short fulcrum ends 16 of the standards 12 and 13, for the purpose of swinging the frame A along a pivot axis located between the trackways 10 and 11, and preferably closer to the trackway 10 than the trackway 11. The frame with the vehicle thereon is readily overbalanced, and due to the relation of the short fulcrum ends 16 with respect to the track 10, the latter comes into engagement with the floor surface, with the vehicle inclined at substantially 45°, and in this position the center of gravity of the vehicle as disposed on the frame A, is such that it will be located over the track 10 laterally beyond the pivot axis of the fulcrum ends 16 of the standards 12 and 13, and the tipping frame A having a plurality of supporting points, that is, on the trackway 10 and the fulcrum ends 16, enables the vehicle frame A to come to a rest position for stably holding the vehicle C in a properly tipped relation so that an operator may have ready access to the under parts of the chassis thereof.

Referring to the tilting device B, the same includes the trackways 71 and 72, of identical construction, which are mounted in parallelism upon the spaced standards 73 and 74. The standards 73 and 74 are of identical construction, each including a straight line base 75 having short fulcrum ends 76 and 77 at opposite ends thereof, as shown in Figure 6. The standards 73 and 74 furthermore each include spaced uprights 78 and 79, at the ends of the straight portion 75, adjacent the fulcrum ends 76 and 77, which at the upper ends thereof support a rigid cross beam structure 80, of any approved construction such as shown in Figure 6 of the drawings. One end of the cross beam 80 for each of the standards extends at 81 beyond the uprights 79 in a cantilever arrangement with respect thereto, being secured beneath and to the trackway 72. At the opposite ends the cross beams 80 of the standard extend in cantilever arrangement at 82 beyond the uprights 78 and are secured at their outer ends beneath and to the trackway 71. These cross beams are of multiple part construction, which may be varied to suit circumstances.

The trackways 71 and 72 are of the general construction of the trackway 10 above described for the preferred embodiment of the invention. They each include a pivoted runway portion 85. The trackways 71 and 72 further include upwardly bowed portions 86 between the ends thereof, which are secured to the cross beams of the standards 73 and 74. Outwardly beyond the standard 74 each of the trackways 71 and 72 includes a straight portion 87 having a stop 88 at the free end thereof. The runway portions 85 of the trackways 71 and 72 are respectively detachably pivoted at 89 and 90 respectively at locations between the trackways 71 and 72 to permit the inward swinging of the said runway portions to a position towards the central longitudinal axis of the frame B. Diagonal cross beams 92 and 93 may be respectively provided for the runways of the trackways 71 and 72, having connections at 94 at their forward ends intermediate the ends of the respective runways, and extending therefrom, convergently for releasable connection at 96 to the standard 73, preferably along the longitudinal central axis of the frame B, as shown in full lines in Figures 6 and 7 of the drawings. These connections 96 are releasable, and the rods 92 and 93 may respectively have their ends, when released from the connections 96, connected at 98 and 99 to suitable portions of the framework adjacent the trackways 72 and 71 respectively. Under these circumstances the diagonal cross beams 92 and 93 are crossed, and as shown in the dotted lines in Figure 7 of the drawings, may hold the runways 86 tipped inwardly toward the central longitudinal axis of the framework. Of course, it is to be distinctly understood that under ordinary circumstances only one or the other of the runways will be tipped out of alignment with its respective trackway, in order to permit the tipping of the framework A upon the side intended. It is to be particularly noted from Figures 6 and 7 of the drawings that the short fulcrum ends 76 and 77 of each of the standards 73 and 74 are located in positions well between the lines of the tracks 71 and 72. This enables the framework B to come to a rest position with the vehicle inclined thereon at an angle of approximately 45°, without the necessity of any other bracing or supporting structure. It is a feature of the invention that all parts of the framework A are rigidly connected together except for the pivoted runway. Each of the tracks 71 and 72 between the standards 73 and 74 is provided with an apertured socket 100, into which a fulcrum lever 101 may be laterally inserted to facilitate the tipping of the frame B to one side or the other, as can readily be understood. Anchor members 110 are provided in pairs upon the trackways 71 and 72, in the relation above described for the preferred embodiment of this invention.

From the foregoing it is apparent that an improved tilting device has been provided for vehicles, which is very sturdy in construction, simple, and which may be made at a relatively low cost to efficiently perform the work intended. It is a noteworthy feature of the invention that the framework with the weight of the vehicle thereon may be tipped to a position for supporting the vehicle at an inclination between a truly vertical and an inclined 90° position, in a location at rest without the intervention of additional propping or bracing expedients.

The bowed track portions 28 and 29 are braced by horizontal braces 28ª secured at the ends of the bowed portions of the tracks and braced midway between their ends by an upright 28ᵇ engaging the bowed track between its ends. Bowing the tracks upwardly facilitates clearance of the vehicle during riding of the same onto the tilting device.

Various changes in the shape, size, and arrangement of parts may be made to the forms of invention herein shown and described, without departing from the spirit of the invention or the scope of the claims.

I claim:

1. In a vehicle tilting device a base supporting construction having elevated tracks supported thereon in spaced substantial parallelism, said tracks having the portions thereof over which the vehicle wheels travel for the major distance convexed upwardly to facilitate clearance of the under parts of the vehicle chassis.

2. In a vehicle tilting device a base supporting construction having elevated tracks supported thereon in spaced substantial parallelism, said tracks having the portions thereof over which the vehicle wheels travel for the major distance convex upwardly to facilitate clearance of the under parts of the vehicle chassis, and fulcrum means associated with the base for permitting tipping of the device and vehicle thereon to an inclined position.

3. In combination a vehicle tilting device including a pair of spaced uprights, and an elevated track structure on the spaced uprights for receiving the wheels of a vehicle to elevate the vehicle, the track structure between the spaced uprights being arcuated convexly upwardly.

4. In combination a vehicle tilting device including a pair of spaced uprights, an elevated track structure on the spaced uprights for receiving the wheels of a vehicle to elevate the vehicle, the track structure between the spaced uprights being bowed upwardly, and fulcruming means between the tracks.

5. In a vehicle tilting device the combination of a supporting sub-structure, trackway means supported on the sub-structure, and runway means for the trackway means including a pivoted runway, a rod pivoted with the pivoted runway, and means for selectively clamping said rod for holding the runway in alignment with the trackway means or laterally inclined with respect to the trackway means to permit tilting of the device.

6. In combination a pair of spaced uprights each having short upwardly arcuated fulcrum feet at the base thereof, at opposite sides thereof, said uprights having upper outer ends extending at distances laterally beyond said fulcrum feet, substantially parallel tracks supported on the upper outer ends of said uprights at distances beyond said fulcrum feet in an elevated relation, and cooperating movable runway means having means to align the same with the respective trackways or tilt the same inwardly to permit tilting of the device from the pivot axes of said fulcrum feet.

ALVA WILLIAMSON.